UNITED STATES PATENT OFFICE.

RUDOLF KNIETSCH AND PAUL SEIDEL, OF LUDWIGSHAFEN-ON-RHINE, GERMANY, ASSIGNORS TO THE BADISCHE ANILIN AND SODA-FABRIK, OF SAME PLACE.

NEW FORM OF INDIGO READILY SOLUBLE IN VATS AND METHOD OF MAKING SAME.

SPECIFICATION forming part of Letters Patent No. 671,344, dated April 2, 1901.

Application filed May 21, 1900. Serial No. 17,455. (Specimens.)

*To all whom it may concern:*

Be it known that we, RUDOLF KNIETSCH, a subject of the King of Prussia, German Emperor, and PAUL SEIDEL, a subject of the King of Saxony, doctors of philosophy, residing at Ludwigshafen-on-Rhine, in the Kingdom of Bavaria and Empire of Germany, have invented new and useful Improvements in a New Form of Indigo Readily Soluble in the Vat and Method of Making Same, of which the following is a specification.

It is well known that dry vegetable indigo in the form in which it is usually put upon the market must be ground in specially-constructed mills in order to bring it to a condition in which it will readily and completely dissolve in the indigo-vat. This grinding operation is frequently prolonged for days. Synthetic indigo also under some conditions separates out during its manufacture in a crystalline condition, and the crystals may be of such a size as to injuriously affect the ready solubility of the indigo in the vat. We have discovered that indigo which is with difficulty soluble in the vat, irrespective of its origin, can by a simple treatment be converted into a new form of indigo which can be readily dissolved.

The new process according to our invention consists in treating indigo with sulfuric acid under such conditions of concentration that no sulfonation of the indigo takes place, while a sulfate of indigo or loose combination of sulfuric acid therewith is formed. For this purpose sulfuric acid containing about sixty-five to eighty-five per cent. $H_2SO_4$ can be employed. This sulfate so obtained crystallizes in the form of black-brown needles. This body is treated with water, when it decomposes and the regenerated indigo separates out in a physical condition that is fitted for use in all kinds of vats, it being easily soluble even in the fermentation-vat, which acts particularly mildly. The new readily-soluble product is chemically indigo; but its physical condition is changed by the treatment, so that from an industrial standpoint it becomes substantially a new product.

The following table will illustrate the difference between our new form of indigo and indigo in the known form:

| | Old indigo paste. | New form of indigo in paste. |
|---|---|---|
| Color | Blue to blue-black. | Brown-red, with a bronze-like luster. |
| Change on treating a twenty-per-cent. paste with— | | |
| (1) Sulfuric acid. | Becomes thicker. | Does not become essentially thicker. |
| (2) Caustic soda. | Becomes thinner. | Does not become essentially thinner. |
| Painted onto glass and dried. | Blue to reddish-blue color. | Red, with a bronze-like luster. |

Or, to explain more fully the above tests, we have identified a specimen of our new product as follows: If we make twenty grams of the dry product into a paste with eighty cubic centimeters of water it constitutes a very fluid mass. If to such a paste we add one cubic centimeter of sulfuric acid of five (5°) degrees Baumé and heat it to a temperature of about thirty (30°) degrees centigrade the paste does not become essentially thicker, while a paste of ordinary indigo is by this treatment converted into a thicker mass. If we take another similar portion of twenty (20) per cent. paste of our new product and mix it with one cubic centimeter of caustic soda-lye of five (5°) degrees Baumé and heat it to a temperature of about thirty (30°) degrees centigrade, the original very fluid mass does not become essentially thinner, while a paste of indigo in the ordinary form under similar treatment becomes distinctly thinner than it was.

The following example will serve to illustrate the manner in which our invention is carried into practical effect and our new vat-soluble indigo is obtained:

Stir about one hundred (100) parts of dry indigo in the form of powder into about five hundred (500) parts of sulfuric acid containing seventy-five per cent. $H_2SO_4$. Warm the mixture while carefully stirring to about thirty degrees centigrade. When the mixture is affected so that a uniform paste is obtained, allow the mass to stand for about an hour. The sulfate of indigo is then formed. To obtain the indigo in the aforesaid new physical condition, add to the entire mass about two thousand (2,000) parts of water. Stir well, collect the new indigo by filtration, and wash until free from acid. The new indigo retains its valuable property of ready solubility in the vat, even after drying.

Now what we claim is—

1. The improvement in the art of expediting the solubility of indigo which consists in combining with it sulfuric acid to a point below sulfonation and then decomposing with water, substantially as described.

2. As a new product the new form of indigo readily soluble in the vat which can be obtained by treating indigo with sulfuric acid to a point below sulfonation and then the product so obtained with water and which possesses the chemical characteristics of indigo but in color is brown-red with a bronze-like luster and which when painted onto glass as a paste and dried has a red appearance with a bronze-like luster, all substantially as described.

In testimony whereof we have hereunto set our hands in the presence of two subscribing witnesses.

RUDOLF KNIETSCH.
PAUL SEIDEL.

Witnesses:
ERNEST F. EHRHARDT,
J. L. HEINKE.